May 12, 1936.  W. T. HONISS  2,040,789
GLASS FEEDING APPARATUS
Filed Dec. 15, 1934
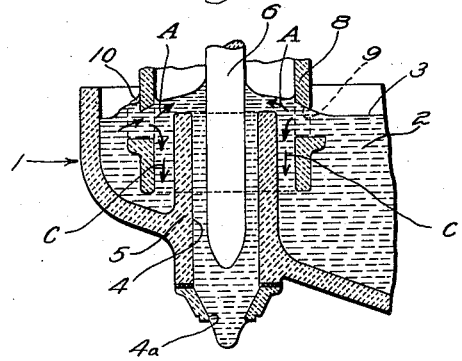
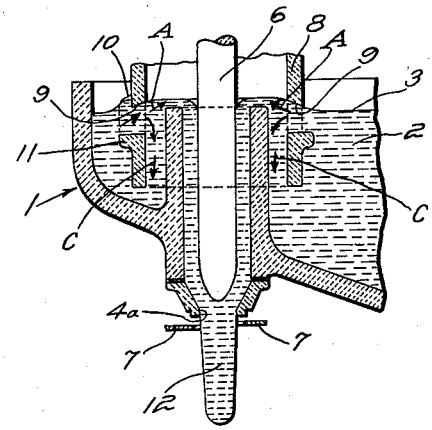
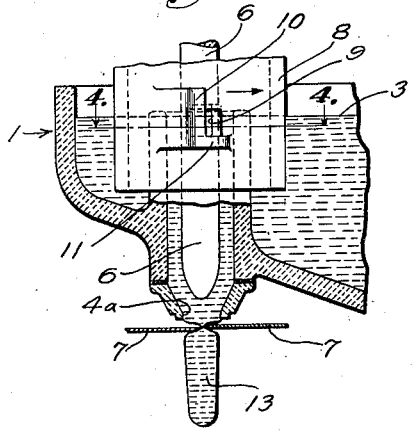
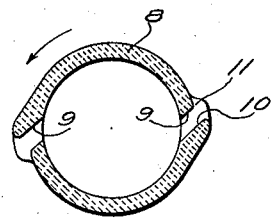
Witness:
W. B. Thayer.
Inventor:
William T. Honiss
by Brown + Parham
Attorneys Patented May 12, 1936

2,040,789

UNITED STATES PATENT OFFICE 2,040,789

GLASS FEEDING APPARATUS

William T. Honiss, West Hartford, Conn., assignor to Hartford-Empire Company, Hartford, Conn., a corporation of Delaware Application December 15, 1934, Serial No. 757,602

15 Claims. (Cl. 49—55)

This invention relates to improvements in glass feeding apparatus, and it consists in the combinations, constructions and arrangements herein described and claimed.

An object of the present invention is to provide a glass feeder which will feed through a bottom discharge outlet of a glass container glass taken only from a level at or near the surface of the glass in the container or at least substantially above the bottom of the glass container, so as to exclude from the discharge outlet refractory contaminated and other heavier layers of glass.

A further object of the invention is to provide a glass feeder having improved means for controlling the discharge of molten glass from a supply body in a glass container through a bottom discharge outlet of that container and adapted to effect an improved mixing and homogenizing of the glass adjacent to the inlet end of the glass discharge outlet.

A still further object of the invention is the provision of a glass feeder of the type having an open glass discharge outlet submerged by glass of the supply body in a feeding container during normal feeding operations but which is adapted to permit a cessation of discharge of glass through the outlet when glass feeding operations are to be temporarily discontinued and to maintain the glass in the feeding container at substantially the temperature and in the condition required for immediate resumption of glass feeding operations when desired.

Other objects and advantages of the invention will hereinafter be pointed out or will become apparent from the following description of a practical embodiment of the invention as shown in the accompanying drawing, in which:

Figure 1 is a fragmentary view showing a longitudinal vertical section of a glass feeding apparatus embodying structural features of the invention;

Fig. 2 is a view similar to Fig. 1 but showing a different stage in the formation of a mold charge mass in suspension from the discharge outlet of the feeding apparatus;

Fig. 3 is a view generally similar to the preceding views but showing parts of the apparatus in elevation and illustrating the position of movable parts of the apparatus at a still different stage in the production of a mold charge; and Fig. 4 is a horizontal sectional view of a rotary glass impelling member that is included in the glass feeding apparatus of the preceding views, the view being through such impelling member at approximately the plane indicated by the section line 4—4 in Fig. 3.

Referring now to the drawing, the numeral 1 in Figs. 1 to 3 inclusive designates a glass feeding container which is shown only in part and which may be the outer end portion of a forehearth or tank extension to which glass may flow from a melting tank, not shown, or be supplied in any suitable known manner.

The walls of the container 1 may be formed of any suitable known material or materials, including an outer layer of insulating material if desired, and may be supported in any suitable known manner. Also, such glass feeding container, which in practical use would include or be provided with suitable cover structure, may be equipped with any suitable known adjuncts, including temperature control means, burners or other heating means, etc., so that a supply body of molten glass therein may be of suitable temperature and viscosity for glass feeding operations. The normal level of the supply body of molten glass in the container may be substantially as indicated at 3.

The parts which have been described so far do not, per se, form any part of the present invention and consequently may be of any suitable known or preferred construction and mode of operation.

In carrying out the invention, I preferably provide a glass feeding container which has its bottom wall formed to slope rearwardly, i. e., toward the source of supply of molten glass, from the outer or front wall of the container, substantially as shown in Figs. 1 to 3 inclusive. The glass feeding container has a vertical glass feeding or discharge passage 4 which, as shown, is the bore of a vertical tubular structure 5, the lower end portion of which depends slightly below the level of the adjacent portion of the bottom wall proper of the glass container while its upper end portion is upstanding within the glass container to a level slightly above the normal level 3 of the supply body of glass in the container. This tubular structure 5 may be formed so that a portion thereof is integral with the bottom wall of the container, as shown, or it may be formed separately and secured in an opening in the bottom wall of the container and joined to the latter in any suitable known manner.

The vertical discharge or feed passage 4 terminates at its lower end in a discharge orifice 4—a which may be the opening at the lower end of a removable and replaceable orifice ring which is, in effect, the lower end portion of the tubular structure 5. The vertical discharge or feed passage 4 preferably is of sufficient area in cross section, at least above the discharge orifice 4—a, to accommodate a vertically reciprocable refractory implement 6 so that a sufficient annular space will exist between the implement 6 and the walls of the discharge passage 4 to permit movement of glass downwardly in such space when the upper end of the discharge passage has been submerged by glass of the supply body in the manner and by means which will presently be described. The implement 6, when glass fills the discharge passage, may be reciprocated vertically in a manner and by the use of mechanism, well known in the art so as periodically to accelerate and periodically to retard, stop or reverse the movement of glass at the discharge orifice, whereby regulably to control the formation below the outlet of successive suspended mold charge masses of glass from which mold charges may be severed by the periodic operations of a suitable severing mechanism, represented by the shear blades 7 in Figs. 2 and 3.

Means for submerging the upper end of the discharge passage with glass from the supply body may comprise a vertically disposed refractory tubular member 8 which depends within the glass feeding container in axial alignment with the discharge passage 4. The lower end portion of such impelling member is immersed in glass of the supply body and is of such character and so operated as to submerge the upper end of the discharge passage continuously with a mass of glass of substantial depth during normal glass feeding operations. To this end, the tubular member 8 preferably has an internal diameter sufficiently larger than that of the tubular discharge passage structure located therewithin to permit flow movement of glass between the inner wall of the tubular member 8 and the enclosed portion of the structure 5 and is provided with one or more ports 9 and with an impelling element or vane 10 associated with each port for impelling glass of the supply body inwardly through the port when the tubular member 8 is rotated in one direction, which in the operation of the apparatus shown in the drawing is counterclockwise. Glass thus impelled inwardly will pass to and over the upper end of the discharge outlet, as indicated by the arrows A in Figs. 1 and 2. Some of such glass may pass downwardly between the lower end portion of the member 8 and the enclosed portion of the structure 5, as indicated by the arrows C.

As best seen in Fig. 4, each port 9 is oblique to a line extending radially from the axis of rotation of the member 8 to that port and the impelling element or vane 10 is in the form of an obliquely extending lateral wing at one side of the port 9. Also, the bottom wall of the port 9 is extended laterally to provide a projecting lip or shelf 11 which serves the dual function of guiding glass horizontally into the port 9 as the member 8 rotates and preventing direct return to the port of glass that has passed downwardly between the lower end portion of the member 8 and the enclosed portion of the structure 5.

In the particular apparatus that I have shown in the drawing, the tubular member 8 is provided with two of the ports 9, each with its associate impelling vane 10 and combined shelf and baffle 11. These ports are located diametrically opposite each other. Obviously, a greater number of such ports may be provided, or, good results may be obtained with the use of a rotary impeller 8 having but one of these ports. The particular ports 9 shown in the drawing extend from about the level of the glass in the supply body downwardly to a substantial depth. The ports may, however, be of greater or less vertical extent and may be located higher or lower with reference to the lower end of the tubular member 8 and/or to the normal glass level 3. I prefer, however, to so position these ports that the upper limits thereof will be approximately at the normal glass level or slightly therebelow.

From the foregoing description of the various parts of the illustrated embodiment of the invention, the operation thereof will be readily understood.

The tubular member 8 may be supported by any suitable known means, many examples of which are known in the art, so that it may be rotated as desired, preferably at a speed that is constant in operation but which may be adjusted. The rotation of the member 8 will thoroughly mix and homogenize the glass of the supply body around and adjacent to the upstanding tubular structure 5 and will keep the upper end of the feed or discharge passage submerged by a substantial mass of glass, the depth of which may be varied by adjustment of the speed of rotation of the member 8. The rotation of the member 8 and the impelling of glass inwardly through the ports 9 will cause also a circulatory movement of glass downwardly between the portion of the member 8 that is below the level of the ports 9 and the enclosed tubular structure 5, thereby producing circulatory movements of the supply body of glass in vertical planes adjacent to the discharge passage structure as well as circulatory currents of glass in a horizontal plane. This assures a highly efficient mixing and homogenizing action. This arrangement also assures that the glass entering the discharge passage will be taken from a level near the surface of the supply body and will pass to the discharge outlet without opportunity for harmful contact with refractory walls or colder glass.

The formation of successive mold charge masses under the control of the reciprocable implement 6 and the severance of successive mold charges, when formed, may follow well known practice. That is, the downstroke of the implement 6 may accelerate discharge of glass to aid in preshaping a suspended mold charge mass, as to form a mold charge mass such as that indicated at 12 in Fig. 2. Thereafter, the implement 6 may be moved upwardly to effect retardation of discharge of glass from the outlet or retraction of glass to attenuate the glass adjacent to the outlet and the severing means may be operated, as by closing the shear blades 7 as shown in Fig. 3, to cut off the preformed mold charge, indicated at 13.

The sloping bottom wall of the container may be utilized to drain rearwardly refractory contaminated glass, which is prevented from entering the discharge passage both by the upwardly extending discharge passage structure 5 and by the downward currents of glass between the structure 5 and the tubular member 8. The refractory contaminated glass and other heavier glass that has drained rearwardly along the sloping bottom wall of the container may be removed from the container, if desired, as by means of structure such as is shown in my copending application for Glass feeding forehearth, Serial No. 750,125, filed Oct. 26, 1934.

The combination of an upwardly extending discharge passage structure and a sloping bottom wall of a glass feeding container for draining refractory contaminated and other heavier glass rearwardly of the passage structure, independently of means for causing or controlling discharge of glass from the container through said discharge passage structure, is not claimed herein. Claims to such subject matter are being made in my said copending application, Serial No. 750,125.

The invention comprehends all such modifications and variations of the structure and mode of operation herein described as fairly fall within the scope of the appended claims.

I claim:

1. Glass feeding apparatus comprising a container for molten glass having a discharge passage provided at its upper end with an inlet located at a level above the normal level of the supply body of molten glass in the container, and rotary means movable horizontally adjacent to the upper end of said discharge passage and rendered effective by rotation thereof to cause flow of glass of a surface portion of the supply body into the inlet of said discharge passage.

2. Glass feeding apparatus comprising a container for molten glass having a substantially vertical discharge passage extending upwardly through the supply body of glass in the container to a level above the normal level of the supply body of glass in the container, and rotary means acting on the glass adjacent to said discharge passage and rendered effective by rotation thereof to move a portion of the supply body of glass to position to submerge the upper end of said discharge passage.

3. Glass feeding apparatus comprising a container for molten glass having a substantially vertical discharge passage extending upwardly through a supply body of molten glass in the container to a level slightly above the normal level of said supply body, and means rotating around the discharge passage in spaced relation therewith and rendered effective by rotation thereof to cause glass of the supply body continuously to submerge the upper end of the discharge passage during normal glass feeding operations.

4. Glass feeding apparatus comprising a container for molten glass having a substantially vertical discharge passage extending upwardly through the bottom of the container and through a supply body of molten glass in the container to a level above the normal level of the supply body, and means moving in the glass around the discharge passage for causing downward currents in the glass next to the outer wall of said discharge passage and for raising of the level of a portion of the supply body of molten glass sufficiently to maintain the supply passage continuously submerged during glass feeding operations.

5. Glass feeding apparatus comprising a container for molten glass having a substantially vertical discharge passage extending through the bottom of the container and upwardly through a supply body of molten glass in the container to a level not below that of the normal level of the supply body in the container, means moving in glass of the supply body in a circle around said discharge passage for impelling glass from the supply body into the upper end of the discharge passage and for mixing and homogenizing glass of the supply body adjacent to said discharge passage.

6. Glass feeding apparatus comprising a container for molten glass having a substantially vertical passage extending through the bottom of the container and upwardly through a supply body of molten glass in the container to a level not below that of the normal level of the supply body in the container, means moving in glass of the supply body in a circle around said discharge passage for impelling glass from the supply body into the upper end of the discharge passage and for mixing and homogenizing the glass of the supply body adjacent to said discharge passage, and means effective on glass in the discharge passage for controlling the issuance of glass from the lower end of said discharge passage.

7. Glass feeding apparatus comprising a container for molten glass having a substantially vertical discharge passage extending through the bottom of the container and upwardly through a supply body of molten glass in the container to a level not below the normal level of said supply body, rotary impelling means for causing movement of an upper portion of glass of the supply body into the upper end of the discharge passage and for maintaining the upper end of said discharge passage continuously submerged beneath molten glass of the supply body, and a vertically reciprocable implement depending into the glass in the discharge passage in spaced relation with the walls thereof.

8. Glass feeding apparatus comprising a glass feeding container having a substantially vertical discharge passage extending upwardly through the bottom of the container and through a supply body of molten glass in the container to a level not below that of said supply body, a rotary tubular member depending into the glass of the supply body around said discharge passage in spaced relation with the walls of said discharge passage, said rotary member including impelling means of such character as to raise the level of a portion of the supply body to position to submerge the upper end of the discharge passage continuously with molten glass of the supply body when said rotary member is rotating.

9. Glass feeding apparatus comprising a glass feeding container having a substantially vertical discharge passage extending upwardly through the bottom of the container and through a supply body of molten glass in the container to a level not below that of said supply body, a tubular member depending into the glass of the supply body in concentric relation with the walls of said discharge passage and in spaced relation therewith, said tubular member having a lateral port located with at least a portion thereof below the surface of the glass of the supply body, said tubular member having glass contacting means adjacent to said port for directing glass of the supply body inwardly through said port to a position over said discharge passage when said tubular member is rotated about its vertical axis.

10. Glass feeding apparatus comprising a container for molten glass having a substantially vertical discharge passage extending upwardly through the bottom of the container and through a supply body of molten glass in the container to a level not below that of said supply body, a tubular member depending into the glass in the container in concentric relation with the walls of said discharge passage, said tubular member being sufficiently larger than the walls of said discharge passage to provide an annular glass flow passage between said tubular member and the walls of said discharge passage, said tubular member having a lateral port at least partially immersed in glass of the supply body, and an outwardly extending vane on said tubular member adjacent to said port adapted when said tubular member is rotated in one direction about its vertical axis to direct glass of the supply body inwardly through said port to position to submerge the upper end of said discharge passage.

11. Glass feeding apparatus comprising a container for molten glass having a substantially vertical discharge passage extending upwardly through the bottom of the container and through a supply body of molten glass in the container to a level not below that of said supply body, a tubular member depending into the glass in the container in concentric relation with the walls of said discharge passage, said tubular member being sufficiently larger than the walls of said discharge passage to provide an annular glass flow passage between said tubular member and the walls of said discharge passage, said tubular member having a lateral port at least partially immersed in glass of the supply body, an outwardly extending vane on said tubular member adjacent to said port adapted when said tubular member is rotated in one direction about its vertical axis to direct glass of the supply body inwardly through said port to position to submerge the upper end of said discharge passage, said tubular member also having a substantially horizontal outwardly extending projection at the bottom of said port for cooperating with said vane to direct glass of the supply body inwardly through said port and to prevent direct upward movement of glass along the outer wall of said tubular member from a lower level into said port.

12. Glass feeding apparatus comprising a container for molten glass having a substantially vertical discharge passage extending upwardly through the bottom of the container and through a supply body of molten glass in the container to a level not below the normal level of said supply body, a rotary tubular member of greater diameter than the walls of said discharge passage, said tubular member depending into the glass of the supply body so that the lower portion of the tubular member is located in spaced concentric relation with the walls of the discharge passage, the portion of the tubular member immersed in glass of the supply body having a plurality of angularly spaced ports in the walls thereof, each of said ports having an outwardly extending shelf at its bottom and having at one side thereof an outwardly extending vane, the side walls of each of said ports and associate vane being oblique to a radius of said tubular member.

13. Glass feeding apparatus comprising a container for molten glass having a substantially vertical discharge passage extending upwardly through the bottom of the container and through a supply body of molten glass in the container to a level not below the normal level of said supply body, a rotary tubular member of greater diameter than the walls of said discharge passage, said tubular member depending into the glass of the supply body so that its lower portion is located in spaced concentric relation with the walls of the discharge passage, the portion of the tubular member immersed in glass of the supply body having a plurality of angularly spaced ports in the walls thereof, each of said ports having an outwardly extending shelf at its bottom and having at one side thereof an outwardly extending vane, the side walls of each of said ports and the associate vane being oblique to a radius of said tubular member, and a vertically reciprocable implement depending into the discharge passage in spaced relation with the walls thereof.

14. Glass feeding apparatus comprising a container for molten glass, said container having a sloping bottom wall and having a substantially vertical passage extending upwardly through said sloping bottom wall and through a supply body of molten glass in the container to a level above the normal level of said supply body, and rotary means moving in the glass of the supply body adjacent to said discharge passage for impelling glass of an upper portion of said supply body to position to submerge the upper end of said discharge passage.

15. Glass feeding apparatus comprising a container for molten glass, said container having a sloping bottom wall and having a substantially vertical passage extending upwardly through said sloping bottom wall and through a supply body of molten glass in the container to a level above the normal level of said supply body, rotary means moving in the glass of the supply body adjacent to said discharge passage for impelling glass of an upper portion of said supply body to position to submerge the upper end of said discharge passage, and a vertically reciprocable implement depending into the discharge passage in spaced relation with the walls thereof.

WILLIAM T. HONISS.